United States Patent [19]

Knothe et al.

[11] 4,299,299

[45] Nov. 10, 1981

[54] WEIGHING MACHINE

[75] Inventors: Erich Knothe, Bovenden; Dieter Blawert, Göttingen; Franz-Josef Melcher, Hardegsen, all of Fed. Rep. of Germany

[73] Assignee: Sartorius GmbH, Fed. Rep. of Germany

[21] Appl. No.: 146,186

[22] Filed: May 2, 1980

[30] Foreign Application Priority Data

May 8, 1979 [DE] Fed. Rep. of Germany ....... 7913204

[51] Int. Cl.³ .............................................. G01G 23/00
[52] U.S. Cl. ................................ 177/264; 200/52 R; 340/365 R; 177/165
[58] Field of Search ............................ 177/165, 264; 340/365 R, 365 C, 365 A; 200/DIG. 1, 181, 52 R

[56] References Cited

U.S. PATENT DOCUMENTS 4,219,089 8/1980 Gard ................................. 177/165

Primary Examiner—Joseph W. Hartary
Attorney, Agent, or Firm—Eric P. Schellin

[57] ABSTRACT

A weighing machine with a function key device and an electronic indicator, wherein the function key device comprises an electrically conductive contact sensor and a micro key device with a movable element arranged behind the contact surface and operatively connected therewith, so that manual pressure on the contact surface can operate the device either by electrical contact with the contact surface or by movement of the micro key device.

3 Claims, 1 Drawing Figure

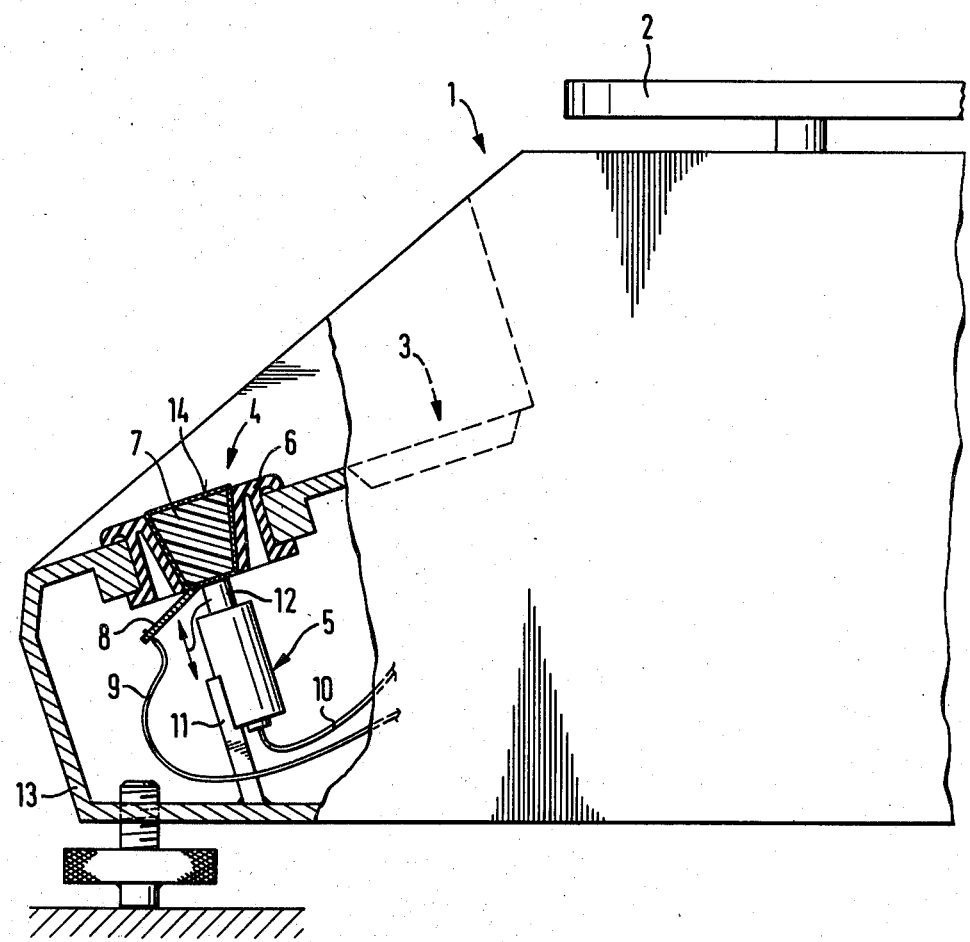

WEIGHING MACHINE

BACKGROUND OF THE INVENTION

Field of the Invention

The invention relates to a weighing machine with a function key device and an electronic indicator. In such electronic weighing machines, particularly in weighers of high precision, it is essential that during the weighing process a minimum of vibrations act upon the weigher, so that the electronic indicator comes to rest as fast as possible and can be read by the user. Any vibration brings about a jumping of the last place or places of the indicator. Such a vibration may be produced by the actuation of the function keys, even when the function keys are keys of very easy motion. On the other hand, such micro key devices have proved very reliable, when e.g. for safety reasons the operator of the weigher must work with gloves.

SUMMARY OF THE INVENTION

The purpose of the invention is therefore to disclose a function key device of such a structure that its operation does not lead to a jarring of the weigher, and on the other hand, the function key device ensures the result that under certain difficult operating conditions an actuation is at any rate assured if a slight jarring of the weigher is tolerated.

According to the invention, this purpose is achieved by means of a structure wherein the function key device is constituted by a combination of a contact sensor with a micro key device arranged behind the sensor in operative connection therewith and responding to manual pressure, the micro key device being actuacted via the same contact surface as the contact sensor. The contact sensor is, in one embodiment, provided with an electrically conductive contact surface which ends in a conductor connecting surface. The contact sensor is preferably constituted as an elastic membrane and is arranged directly in front of the movable element of the micro key device.

The contact sensor, known per se, may be constructed as fault current sensor, as a capacitive sensor, or as an inductive sensor.

The combination of a contact sensor with a micro key device presents the advantage that in normal operation the desired function is set by simply touching the contact sensor, but on the other hand, the function can be set when the operator works with rubber gloves and therefore the contact sensor does not start to function upon simple touch but is only switched by the exertion of a slight manual pressure upon the micro key device which is positioned behind the contact sensor.

BRIEF DESCRIPTION OF THE DRAWINGS

The concept of the invention, which permits a great variety of embodiments, is explained in greater detail in a preferred embodiment with the aid of the attached drawing, wherein:

the single FIGURE shows in a diagrammatical elevational view a weighing machine with the function key device of the invention, with a portion broken away and a part shown in section.

DETAILED DESCRIPTION OF THE PREFERRED EMBODIMENT

The electronic weigher 1 is provided with a weighing scale 2 and a digital electronic indicator 3. In the area of indicator 3, the function key device 4, 5 is arranged, e.g. a tare key, by means of which indicator 3 can be tared to zero.

The function key device 4, 5 consists of the contact sensor 4 and the micro key device 5 arranged behind the contact sensor, the two being operatively connected. Contact sensor 4 is constituted by an elastic membrane element 6 of rubber or soft polyvinylchlorid, which is inserted in a perforation of case 13 of weigher 1 and is provided in the center part with a reinforcement section 7 which is in contact with the movable part 12 of micro key device 5. The reinforcement section 7, is surrounded by and supports a chromium plating layer 14 which is electrically conductive and ends in a conductor connection surface 8. Conductor connection surface 8, as well as the output of micro key device 5, are connected, via lines 9 and 10, respectively, to the electronic devices, not shown, of weigher 1 and are switched to an operative position. Micro key device 5 is fixed, by means of a plate bar holder 11 to case 13.

If contact sensor 4 is constructed, e.g., as a fault current key device, a simple touching of contact surface 14 suffices to carry out the operation, in this case the taring of indicator 3 to zero, without jarring weigher 1 in this operation. When for any reasons weigher 1 can be operated with rubber gloves only, contact sensor 4 does not respond to simple touching. It is rather necessary to exert a very slight pressure upon contact surface 14 so that membrane element 6 moves in the direction of micro key device 5 and displaces the movable part 12 of micro key device 5 in an operative way.

What we claim as new and desire to secure by United States Letters Patent is:

1. A weighing machine with a function key device and an electronic indicator, characterized in that, the function key device is constituted by the combination of an electrically conductive contact sensor and a micro key device having a movable element arranged behind the sensor in operative connection therewith and responding to manual pressure, the micro key device being actuated by manual pressure on the same contact surface as the contact sensor.

2. A weighing machine as in claim 1, characterized in that, the contact sensor is provided with an electrically conductive contact surface, which ends in a conductor connection surface.

3. A weighing machine as in claim 1 or 2, characterized in that, the contact sensor is constructed as an elastic membrane and is arranged directly in front of the movable element of the micro key device.

* * * * *